(12) United States Patent
Masuyama

(10) Patent No.: US 8,446,623 B2
(45) Date of Patent: May 21, 2013

(54) IMAGE FORMING APPARATUS, METHOD, AND COMPUTER-READABLE STORAGE MEDIUM STORING A PROGRAM

(75) Inventor: Yuka Masuyama, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 472 days.

(21) Appl. No.: 12/683,801

(22) Filed: Jan. 7, 2010

(65) Prior Publication Data

US 2010/0182642 A1    Jul. 22, 2010

(30) Foreign Application Priority Data

Jan. 16, 2009    (JP) .................................. 2009-008244

(51) Int. Cl.
*G06F 3/12*    (2006.01)
*G08B 21/00*    (2006.01)

(52) U.S. Cl.
USPC .......................... 358/1.15; 358/1.1; 340/540

(58) Field of Classification Search
USPC .................... 358/1.1, 1.15; 340/540
See application file for complete search history.

(56) References Cited

U.S. PATENT DOCUMENTS

| 5,963,641 | A  | * | 10/1999 | Crandall et al. .................. 380/2 |
| 7,299,413 | B2 | * | 11/2007 | Mori ............................. 715/255 |
| 7,603,618 | B2 |   | 10/2009 | Mori et al. |
| 2004/0186801 | A1 |   | 9/2004 | Morita |
| 2007/0139695 | A1 | * | 6/2007 | Young et al. ................. 358/1.15 |
| 2009/0292987 | A1 | * | 11/2009 | Sorenson ..................... 715/255 |

FOREIGN PATENT DOCUMENTS

| JP | 4-373065 A | 12/1992 |
| JP | 2003-16056 A | 1/2003 |
| JP | 2003-162519 A | 6/2003 |
| JP | 2004-287665 A | 10/2004 |
| JP | 2005-311477 A | 11/2005 |

* cited by examiner

*Primary Examiner* — King Poon
*Assistant Examiner* — Iriana Cruz
(74) *Attorney, Agent, or Firm* — Fitzpatrick, Cella, Harper & Scinto

(57) ABSTRACT

Finishing settings to be applied to a new subset are selected from finishing settings applied to existing subsets in a file, and when the new subset is set to be inserted into the file, the selected finishing settings are applied to the new subset and the new subset is inserted. When an existing subset in the file is to be replaced with the new subset, the selected finishing settings are applied to the new subset, and the existing subset in the file is replaced with the new subset.

9 Claims, 19 Drawing Sheets

F I G. 20

|  |  | GLOBAL SETTINGS | | | | | |
|---|---|---|---|---|---|---|---|
|  |  | PUNCHING | | | STAPLING | | |
| SUBSET SETTINGS | | OFF | LEFT | RIGHT | Off | Corner | Double |
| PUNCHING | OFF | ○ | × | × | ○ | ○ | ○ |
|  | LEFT | × | ○ | × | ○ | ○ | ○ |
|  | RIGHT | × | × | ○ | ○ | ○ | ○ |
| STAPLING | Off | ○ | ○ | ○ | ○ | × | × |
|  | Corner | ○ | ○ | ○ | ○ | ○ | × |
|  | Double | ○ | ○ | ○ | ○ | × | ○ |

IMAGE FORMING APPARATUS, METHOD, AND COMPUTER-READABLE STORAGE MEDIUM STORING A PROGRAM

BACKGROUND OF THE INVENTION

1. Field of the Invention

The present invention relates to an image forming apparatus, method, and computer-readable storage medium storing a program that make print settings in a subset within a print job.

2. Description of the Related Art

There is a strong market demand for subset finishing, which enables multiple different subsets to be set within a single job. A "subset" is a unit indicating a collection of pages defined within a single job. "Setting different subsets", meanwhile, refers to a case where, for example, stapling is set for a certain subset but is not set for other subsets.

Distribution texts can be given as an example of one of the primary use cases of such subset printing. Distribution texts contain multiple subsets enclosed within a binder, and each subset may have different print settings.

With such distribution texts, there are situations where a specific subset within the multiple subsets is replaced with another subset, settings of an existing subset are applied to new data and the resulting data is inserted in a different location within the distribution text, and so on. In such a situation, with a distribution text, there are cases where, for example, a practice subset is replaced, an answer subset is newly inserted, and so on.

There is also market demand for the easy alteration of such subset finishing settings, such as insertion, replacement, and so on, for subsets in jobs saved in an image controller.

In an attempt to implement subset insertion such as that described above, existing techniques have provided a function for merging multiple jobs saved in an image controller. In this merging method, data saved within the image controller is selected and merged with the beginning or end of another job, thereby configuring a single new job. With respect to insertion at the page level, multiple RIPped jobs saved within the image controller can be inserted among jobs at the page level.

Japanese Patent Laid-Open No. 2003-162519 (Patent Document 1) discloses a document processing system that makes it possible to choose whether to apply the source settings or target settings when inserting a document defined as a chapter into a different document defined as a chapter using a document processing application.

However, with Patent Document 1, either the source settings or the target settings are applied in all cases, and thus the settings of an arbitrary chapter different from the source and the target cannot be applied. Therefore, when a chapter having settings different from a user's intentions is present in the insertion location, it is necessary to change the settings of the source or target chapter in advance. Alternatively, it is necessary for the user to prepare a new chapter having the settings that he or she intends, which increases his or her workload.

SUMMARY OF THE INVENTION

An aspect of the present invention is to eliminate the above-mentioned problems with the conventional technology. The present invention provides an image forming apparatus that enables a user to obtain a desired printing result with ease when adding a new subset such as a chapter or the like, method, and computer-readable storage medium storing a program.

The present invention in its first aspect provides an image forming apparatus capable of applying finishing settings to each of subsets, in a file, that contain multiple pages, the apparatus comprising:

a setting unit configured to set a subset already existing in the file to be replaced with a new subset;

a selection unit configured to select, from the subsets already existing in the file, a subset having finishing settings that are to be applied to the new subset; and a replacement unit configured to apply the finishing settings of the subset selected by the selection unit to the new subset and replaces the subset already existing in the file with the new subset.

The present invention in its second aspect provides an image forming method executed by an image forming apparatus capable of applying finishing settings to each of subsets, in a file, that contain multiple pages, the method comprising the steps of:

setting a subset already existing in the file to be replaced with a new subset;

selecting, from the subsets already existing in the file, a subset having finishing settings that are to be applied to the new subset; and applying the finishing settings of the subset selected by the step of selecting to the new subset and replacing the subset already existing in the file with the new subset.

The present invention in its third aspect provides a computer-readable storage medium holding a program for applying finishing settings to each of subsets, in a file, that contain multiple pages, the program causing a computer to:

set a subset already existing in the file to be replaced with a new subset;

select, from the subsets already existing in the file, a subset having finishing settings that are to be applied to the new subset; and apply the finishing settings of the selected subset to the new subset and replace the subset already existing in the file with the new subset.

According to the present invention, printing attributes for setting a subset to be added can be set with ease.

Further features of the present invention will become apparent from the following description of exemplary embodiments with reference to the attached drawings.

BRIEF DESCRIPTION OF THE DRAWINGS

FIG. 20 is a diagram illustrating an example of a conflict chart.

DESCRIPTION OF THE EMBODIMENTS

Figure 1:
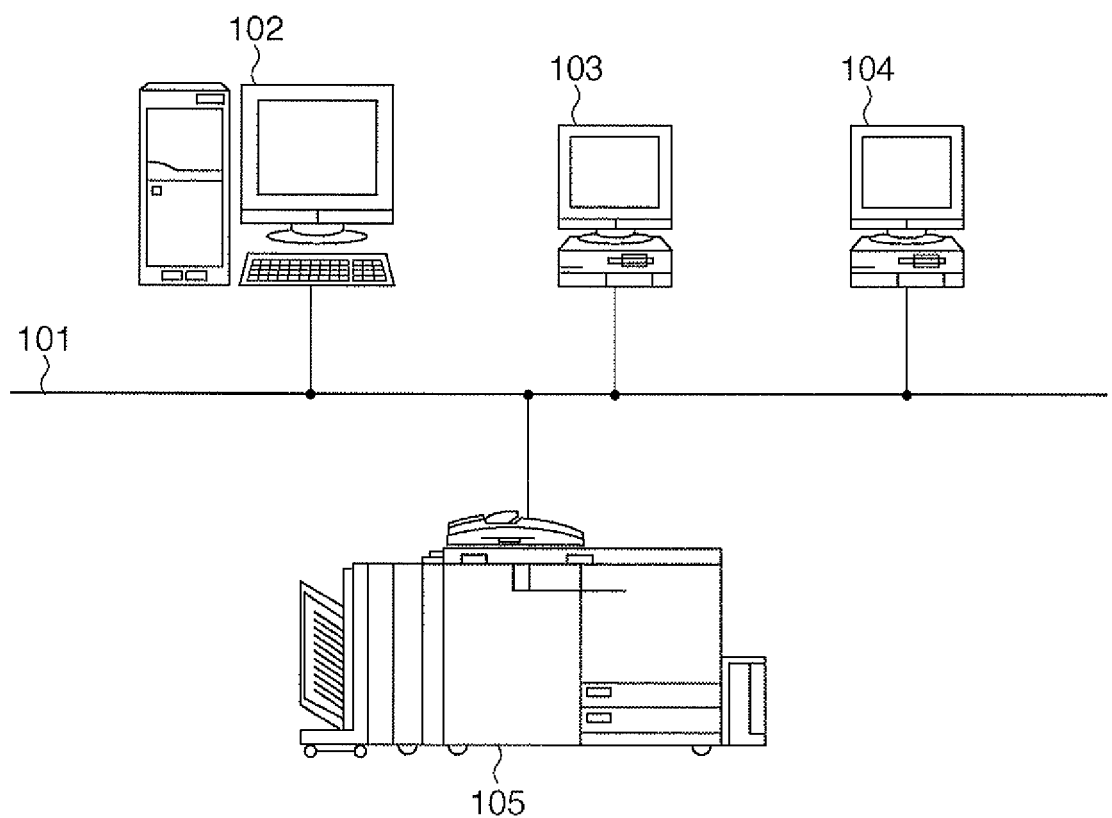
FIG. 1 is a diagram illustrating the configuration of a digital printing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that identical constituent elements shall be given identical reference numerals, and descriptions thereof shall be omitted.

FIG. 1 is a diagram illustrating the configuration of a digital printing system. Here, one or more print servers 102, client PCs 103 and 104, and MFPs 105 are connected to a network 101. "MFP" (multifunction peripheral) used here generally refers to a complex peripheral device provided with multiple functions.

The print server 102 performs a RIPping (raster image processing) process based on image information, print settings information, and so on in a job inputted from the exterior, and sends the resultant to a connected MFP. Furthermore, the print server 102 is capable of collectively managing inputted jobs, and can perform control such as pausing jobs, changing settings, and resuming printing, as well as copying, moving, and deleting jobs.

The client PCs 103 and 104 serve to edit and give the instruction for printing of inputted application files and load print-ready files, and also serve to monitor the devices, jobs, and so on managed by the print server 102 and assist in the aforementioned control. The MFP 105 is an image forming apparatus having various functions, such as scanning, printing, copying, and so on.

Figure 2:
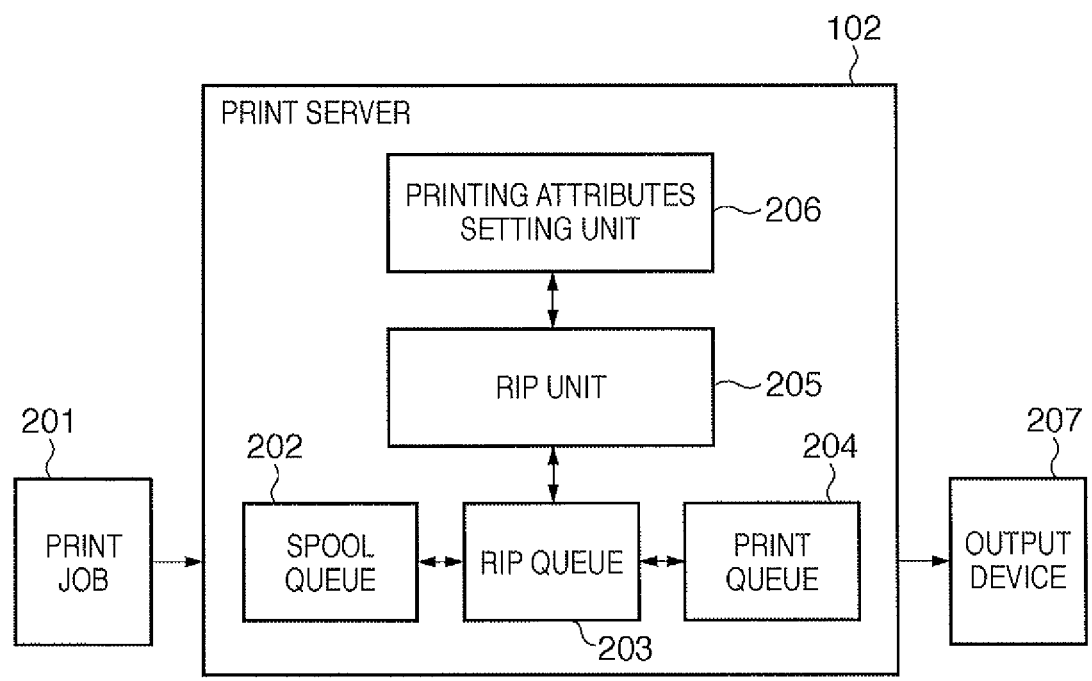
FIG. 2 is a diagram illustrating an example of the configuration of the print server shown in FIG. 1.

FIG. 2 is a diagram illustrating an example of the configuration of the print server 102 shown in FIG. 1. A spool queue 202 is a queue for spooling a print job 201 inputted from the exterior. Next, a RIP queue 203 is a queue for collecting jobs that have been RIPped by a RIP unit 205.

A RIPped job that has entered the RIP queue 203 can be returned to the spool queue 202 by removing the raster data. A print queue 204 is a queue for collecting jobs for which a print request has been made and which are standing by for printing. Jobs in the print queue 204 can be returned to the spool queue or the RIP queue by canceling those jobs.

The RIP unit 205 performs a RIPping process on an inputted job based on image information, print settings information, and so on of the job. A printing attributes setting unit 206 holds printing attributes that can be set within the print server 102. An output device 207 receives print jobs (PDL data) transmitted from the print queue 204 and performs an output process thereon. The output device 207 is, for example, the MFP 105 shown in FIG. 1.

Figure 3:
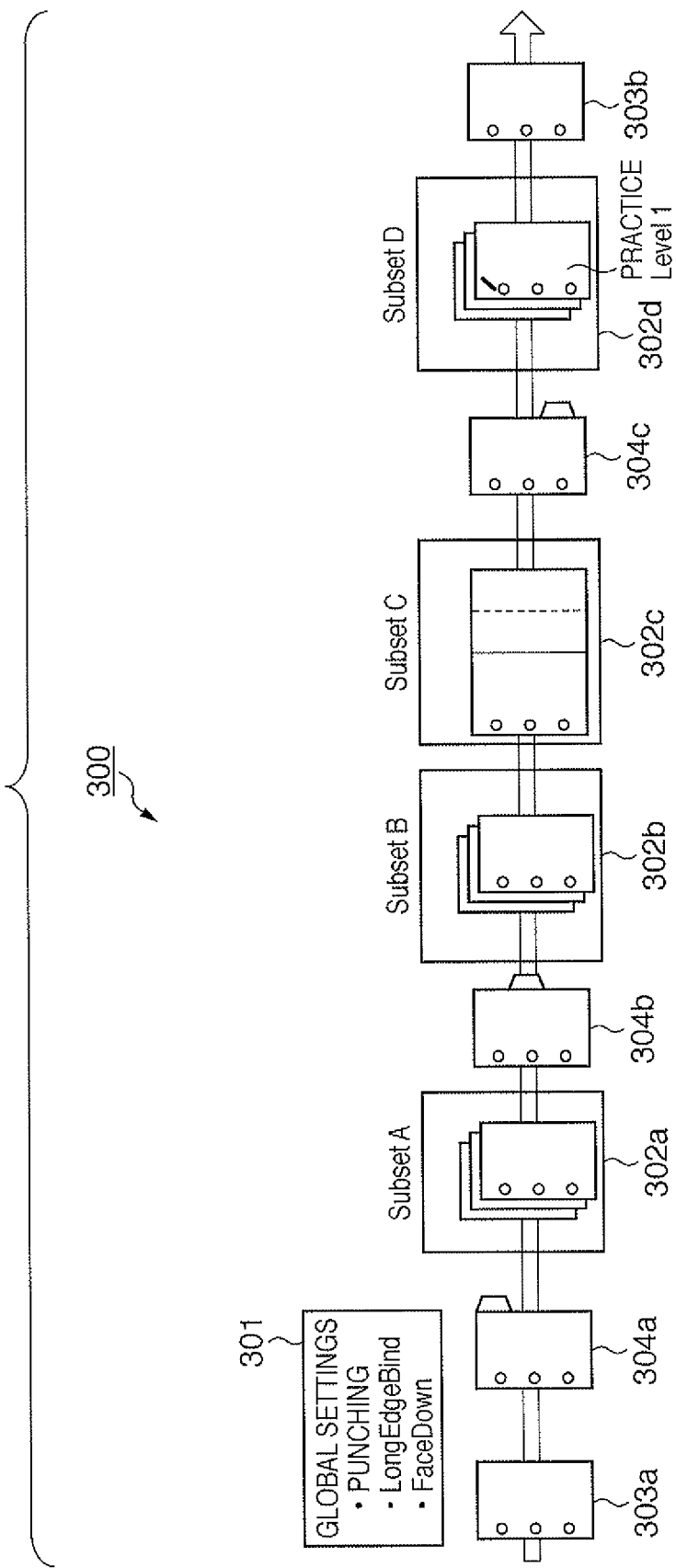
FIG. 3 is a diagram illustrating an example of a job having multiple subsets.

FIG. 3 is a diagram illustrating an example of a job having multiple subsets. Hereinafter, a job having multiple subsets shall be called a "master job".

In general, print jobs and the like are configured of data and printing attributes, but the data of a master job 300 shown in FIG. 3 is a file having a book structure. Furthermore, units of multiple pages are compiled as subsets. A "subset" is a unit indicating a collection of pages defined within a single job. In addition, unique finishing attributes (finishing settings) can be set in each subset.

Here, global settings 301 expresses global printing attributes set for the master job as a whole. In FIG. 3, "punch", "long edge bind", and "face down" are set as the global settings. These print settings are applied to all subsets.

The master job in FIG. 3 is configured of a subset 302a (subset A), a subset 302b (subset B), a subset 302c (subset C), and a subset 302d (subset D). It should be noted that because subsets are configured of multiple pages, they are sometimes referred to as "page groups". Subsets are also sometimes referred to as "chapters". In other words, "subset" indicates one of the portions of which a print job is configured.

Tab sheets 304a, 304b, and 304c are defined for placement between subsets, and a cover sheet 303a and a back cover sheet 303b are defined for the job as a whole. Finishing printing attributes unique to that subset are set for each of the subsets A, B, C, and D. These printing attributes are, however, set so as not to conflict with the global settings.

Figure 4:
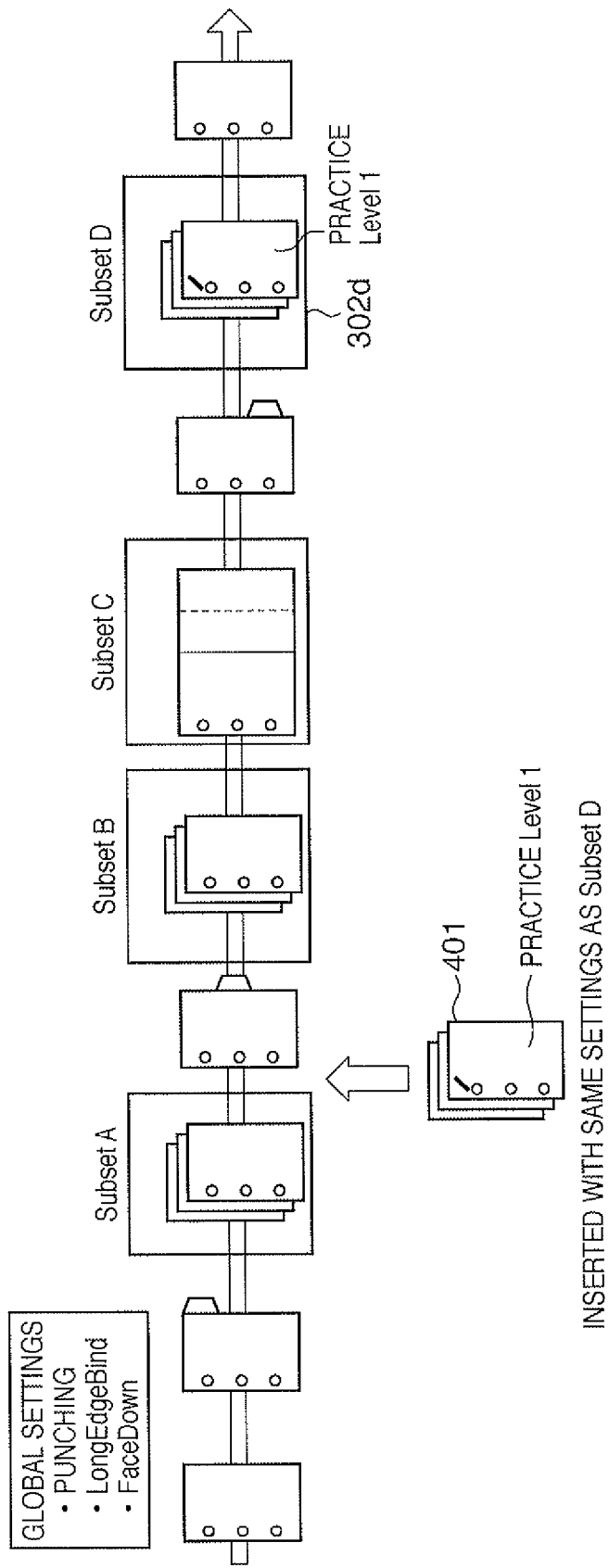
FIG. 4 is a diagram illustrating an example of inserting insert data into a master job.

FIG. 4 is a diagram illustrating an example of inserting insert data 401 into the master job 300. The insert data 401 (a new subset) is inserted after the subset A, carrying over the printing attributes of a specified subset, or the subset 302d (subset D).

Figure 5:
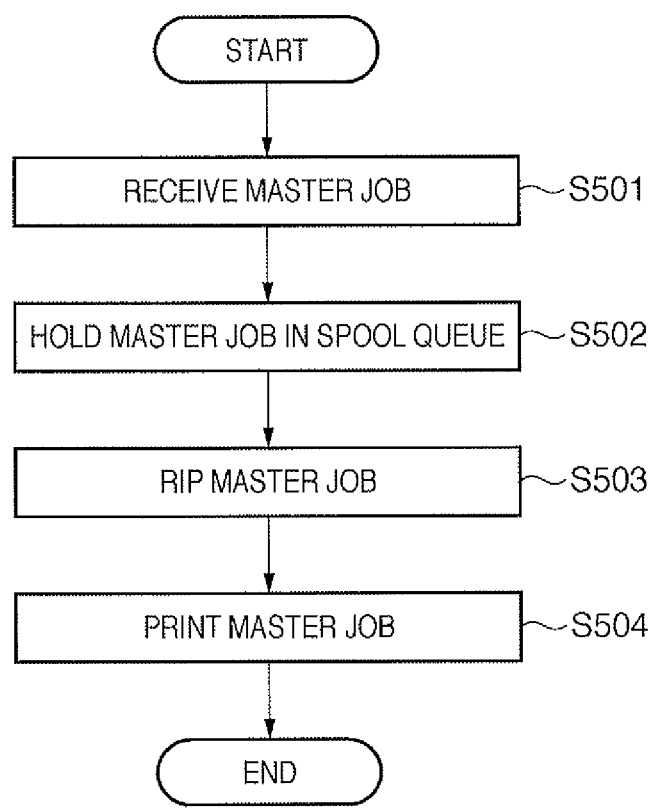
FIG. 5 is a flowchart illustrating a procedure for processing performed by a print server from when a job having multiple subsets is sent to the print server to when that job is printed.

FIG. 5 is a flowchart illustrating a procedure for processing performed by the print server from when the print server 102 receives the master job 300 having multiple subsets to when that job is printed. In step S501, the print server 102 receives the master job 300 (whose printing attributes have already been set) including multiple subsets, which has been transmitted from the client PC 103.

In step S502, the job received in step S501 is held in the spool queue 202 of the print server 102.

In step S503, the print server 102 RIPs the job held in the spool queue in accordance with the printing attributes of that job. "RIPping" refers to a process for, for example, converting PDL data into image data.

In step S504, the job RIPped in step S503 is transmitted to the print queue 204, transmitted from the print server 102 to the output device 207, and is then printed.

In this manner, in the present embodiment, printing attributes are set for each subset in advance, and thus it is possible to perform subset insertion and replacement processes on a master job RIPped in accordance with those printing attributes.

Figure 6:
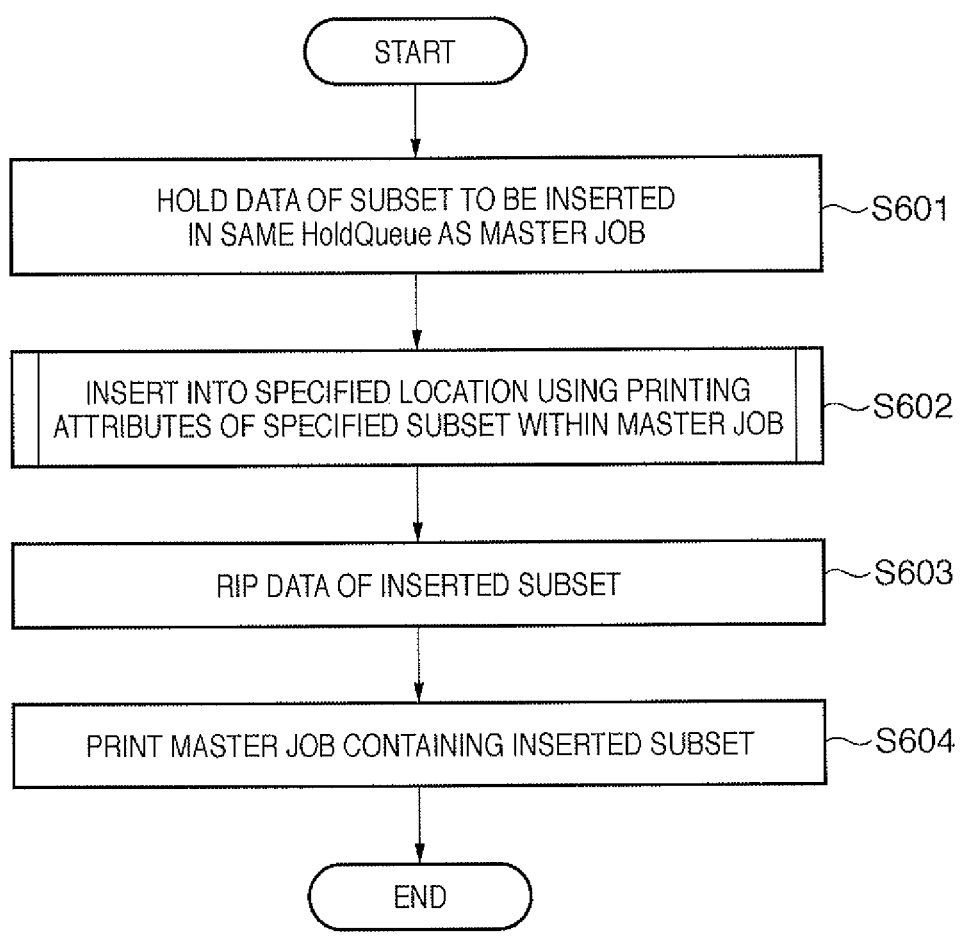
FIG. 6 is a flowchart illustrating a procedure for processing performed when inserting insert data into a master job.

FIG. 6 is a flowchart illustrating a procedure for processing performed when inserting the insert data 401 into the master job 300, as shown in FIG. 4.

In step S601, the print server 102 receives the insert data 401 to be inserted (added) and holds that data in the spool queue 202.

In step S602, the print server 102 applies the settings of a specified subset within the master job to the insert data 401, and inserts the insert data 401 at a specified location. This step shall be described in detail later.

In step S603, the print server 102 uses the RIP unit 205 to RIP the insert data 401 whose printing attributes have been set. In the present embodiment, rather than RIPping the entire master job again, only the insert data 401 is RIPped. As a result, the speed of the print processing of the job can be increased.

In step S604, the print server 102 holds the insert data 401 in the print queue 204, and sends that data along with the master job 300 to the output device 207. After this, the master job 300 is printed by the output device 207.

Figure 7:
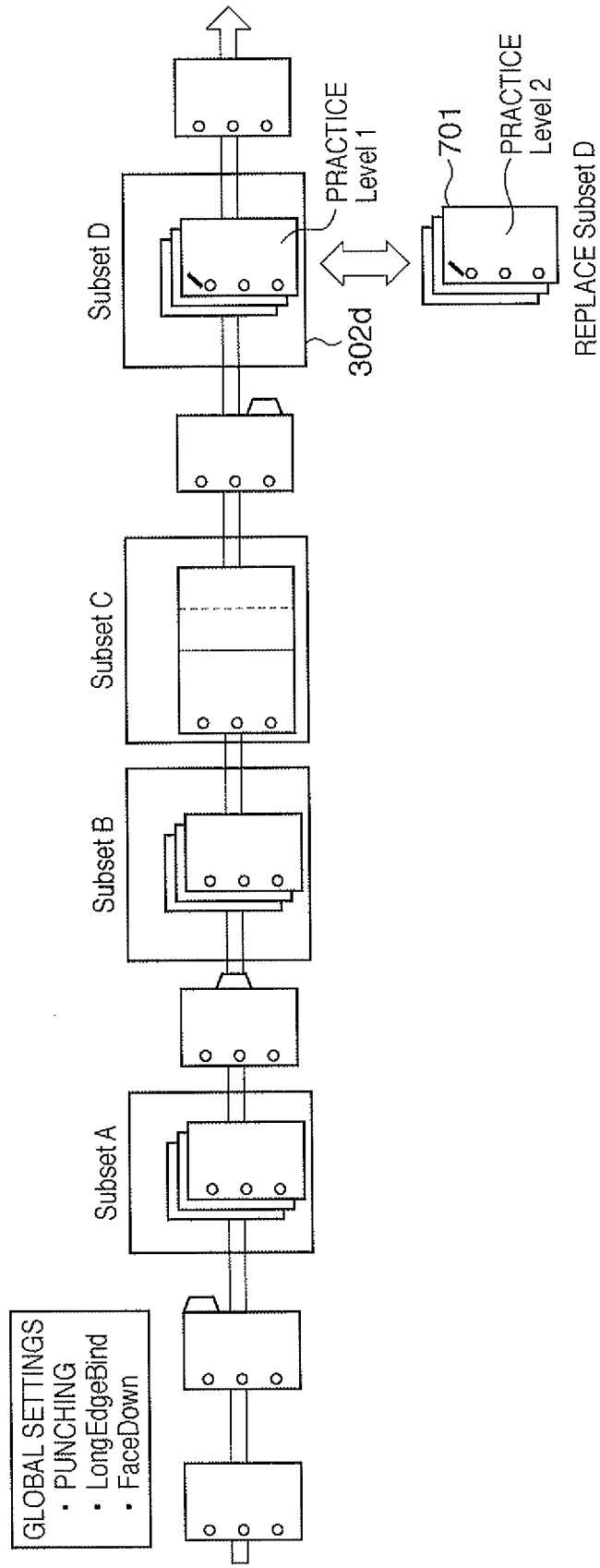
FIG. 7 is a diagram illustrating an example of replacing an arbitrary subset within a master job with replacement data.

FIG. 7 is a diagram illustrating an example of replacing an arbitrary subset within the master job 300 with replacement data 701. The replacement data 701 (a new subset) replaces the specified subset 302d (subset D). At this time, the printing attributes of the subset D are carried over to the replacement data 701.

Figure 8:
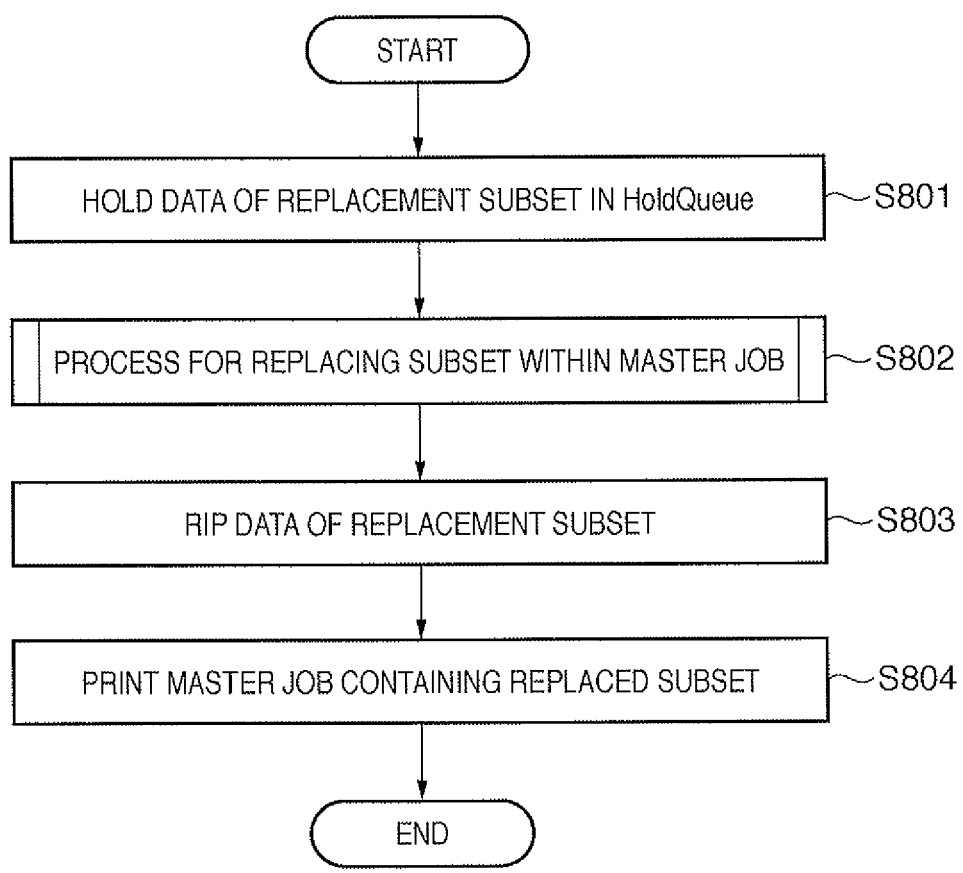
FIG. 8 is a flowchart illustrating a procedure for processing performed when replacing data within a master job with replacement data.

FIG. 8 is a flowchart illustrating a procedure for processing performed when replacing a subset within the master job 300 with the replacement data 701.

In step S801, the print server 102 holding the master job 300 receives the replacement data 701 and holds that data in the spool queue 202.

In step S802, the print server 102 performs a process for replacing a selected arbitrary subset within the master job 300 with the replacement data 701. This step shall be described in detail later.

In step S803, the print server 102 uses the RIP unit 205 to RIP the replacement data 701 whose printing attributes have been set. In the present embodiment, rather than RIPping the entire master job again, only the replacement data 701 is RIPped. As a result, the speed of the print processing of the job can be increased.

In step S804, the print server 102 holds the replacement data 701 in the print queue 204, sends that data along with the master job 300 to the output device 207; the master job 300 is then printed by the output device 207.

Figure 9:
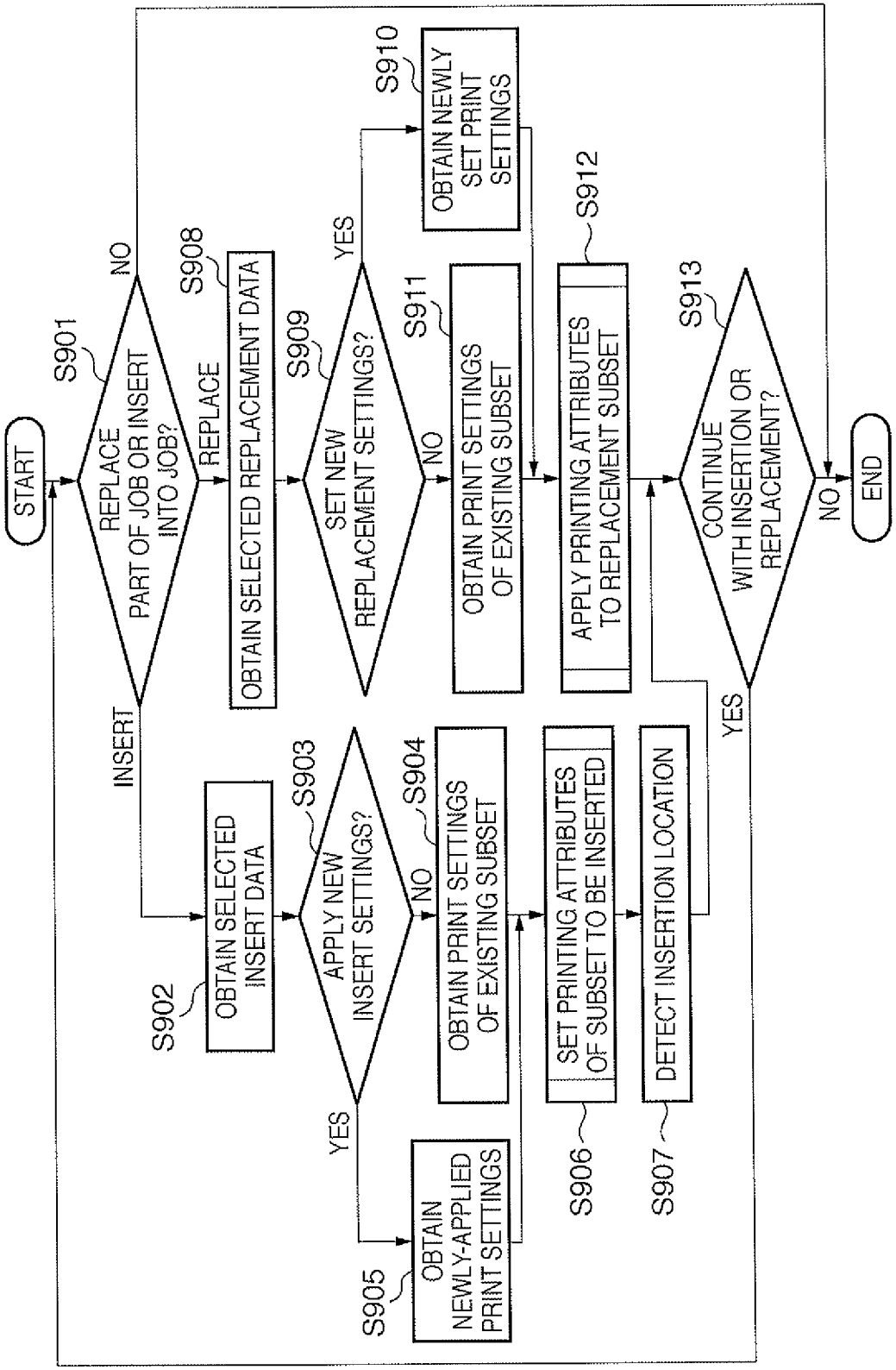
FIG. 9 is a flowchart illustrating details of the processes of steps S602 and S802.

FIG. 9 is a flowchart illustrating details of the processes of steps S602 and S802. In step S901, the print server 102 determines whether the menu button selected by a user in the settings window shown in FIG. 12 is an "insert" menu button 1210 or a "replace" menu button 1211.

Here, if it has been determined that the replacement process has been selected, the procedure advances to step S908, whereas if it has been determined that the insertion process has been selected, the procedure advances to step S902. The process ends if it has been determined that neither process has been selected.

Figure 13:
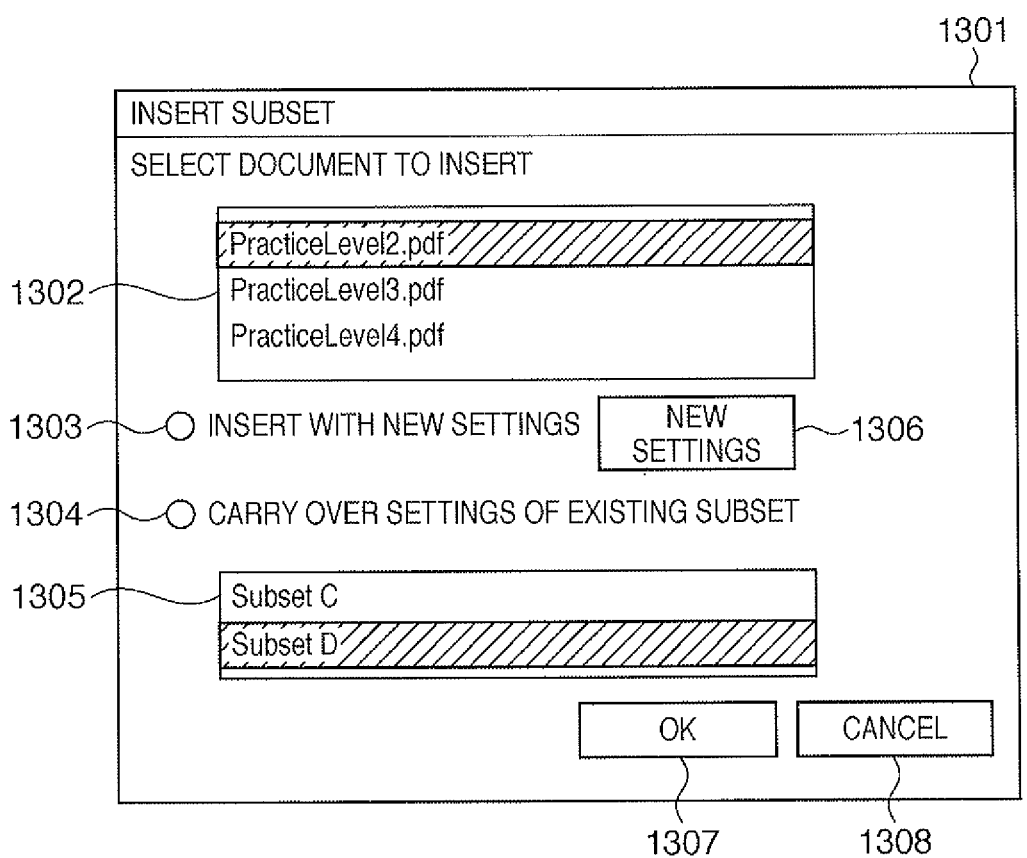
FIG. 13 is a diagram illustrating an example of a settings window for selecting insert data and a subset for applying print settings to the insert data.

In step S902, the print server 102 obtains insert data (that is, the insert data 401) selected by the user in a menu 1302, for selecting insert data, in the settings window shown in FIG. 13. Note that the process of S902 is an example of a first selection unit.

Figure 12:
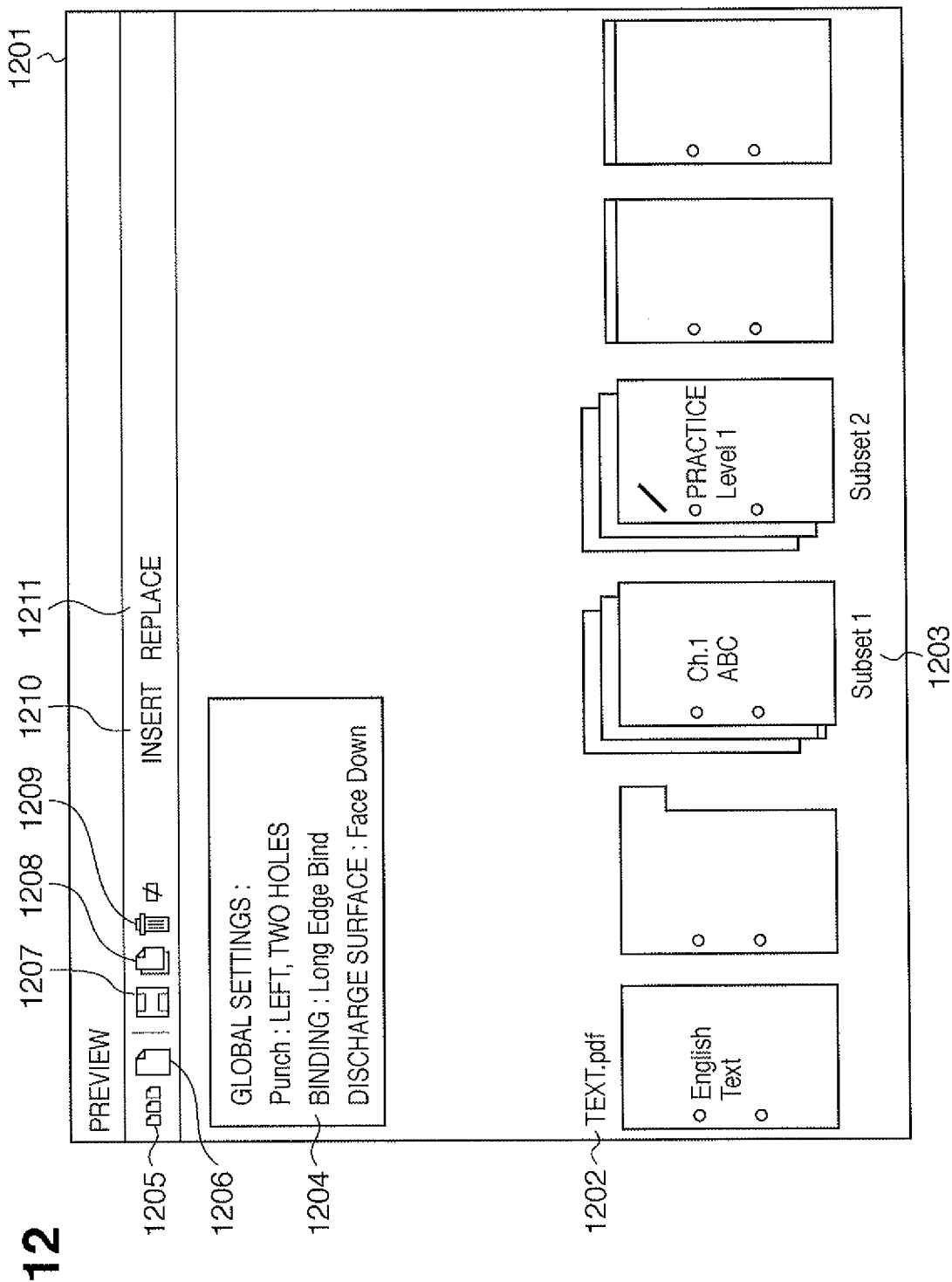
FIG. 12 is a diagram illustrating an example of a settings window for making insertion and replacement settings.

FIG. 13 is a window displayed when the insertion process has been selected from the window shown in FIG. 12. The user can specify the insert data through the menu 1302, and can also select, using a radio button 1304 and a menu 1305, the printing attributes of a subset as printing attributes to apply to the insert data.

In step S903, the print server 102 determines whether the process selected by the user through the settings window shown in FIG. 13 is a "new settings" process indicated by a radio button 1303 or a "carryover settings" process indicated by a radio button 1304.

Here, if it has been determined that new printing attributes are to be set, the procedure advances to step S905. However, if it has been determined that the printing attributes of an existing subset within the master job 300 are to be carried over, the procedure advances to step S904.

In step S905, the print server 102 obtains new print settings set as desired by the user through a button 1306 in the settings window shown in FIG. 13, and sets those settings as the new printing attributes of the insert data 401.

In step S904, the print server 102 obtains the print settings of the subset selected through the menu 1305. Note that the process of S904 is an example of a second selection unit.

In step S906, the obtained subset print settings are carried over and applied to the settings of the insert data 401 obtained in step S902. Note that the process of S906 is an example of an application unit. To use the example shown in FIG. 7, the print server 102 applies the printing attributes of the subset D selected from the menu shown in FIG. 13 to the printing attributes of the subset 701 that is to be inserted. This step shall be described in detail later.

In step S907, the print server 102 detects the insertion location specified by the user and inserts the insert data 401 at the specified insertion location.

Next, the case where "replace" was determined as being selected in step S901 shall be described. In step S908, the print server 102 obtains the subset to be replaced as selected by the user through a menu 1702 in the settings window shown in FIG. 18, and the replacement data 701 held in the print server 102 as set through a menu 1703. Note that the process of selecting the replacement data from the menu 1703 in S908 is an example of a first selection unit.

Figure 18:
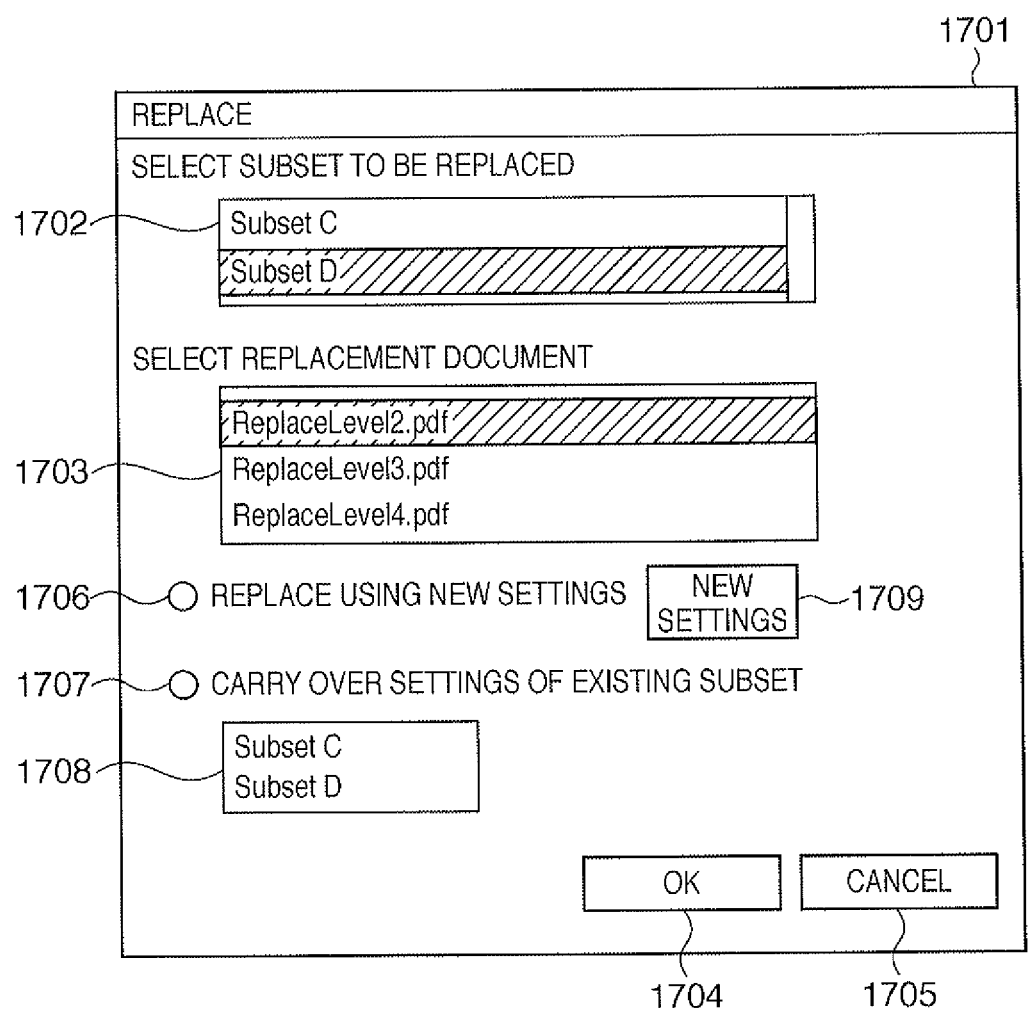
FIG. 18 is a diagram illustrating an example of a settings window for selecting replacement data and a subset to replace.

In step S909, the print server 102 determines whether the process selected by the user through the settings window shown in FIG. 18 is a "new settings" process indicated by a radio button 1706 or a "carryover settings" process indicated by a radio button 1707.

Here, if it has been determined that new printing attributes are to be set, the procedure advances to step S910. However, if it has been determined that the printing attributes of an existing subset within the master job 300 are to be carried over, the procedure advances to step S911.

In step S910, the print server 102 obtains new printing attributes set as desired by the user through a button 1709 in the settings window shown in FIG. 18, and sets those attributes as the new printing attributes of the replacement data 701.

In step S911, the print server 102 obtains the print settings of the subset selected through a menu 1708, which is, for example, the subset 302d (the subset D). Note that the process of S911 is an example of a second selection unit. In step S911, the print server 102 applies the obtained subset printing attributes to the replacement data 701 obtained in step S908. Note that the process of S908 is an example of an application unit. This step shall be described in detail later.

Here, in the present embodiment, the printing attributes of the subset to be replaced (selected through the menu 1702) may be applied automatically to the replacement data 701, rather than performing steps S910 and S911.

In step S912, the print server 102 applies the printing attributes to the replacement data 701.

In step S913, the print server 102 determines whether to continue on to a new subset insertion/replacement process. The procedure returns to step S901 when continuing on to a new process. However, if the insertion/replacement process is to be ended, the procedure ends.

Repeatedly performing the insertion/replacement process makes it possible to insert or replace multiple pieces of data at multiple arbitrary locations within a master job, thereby making the reusability of the master job easier and more effective.

Figure 10:
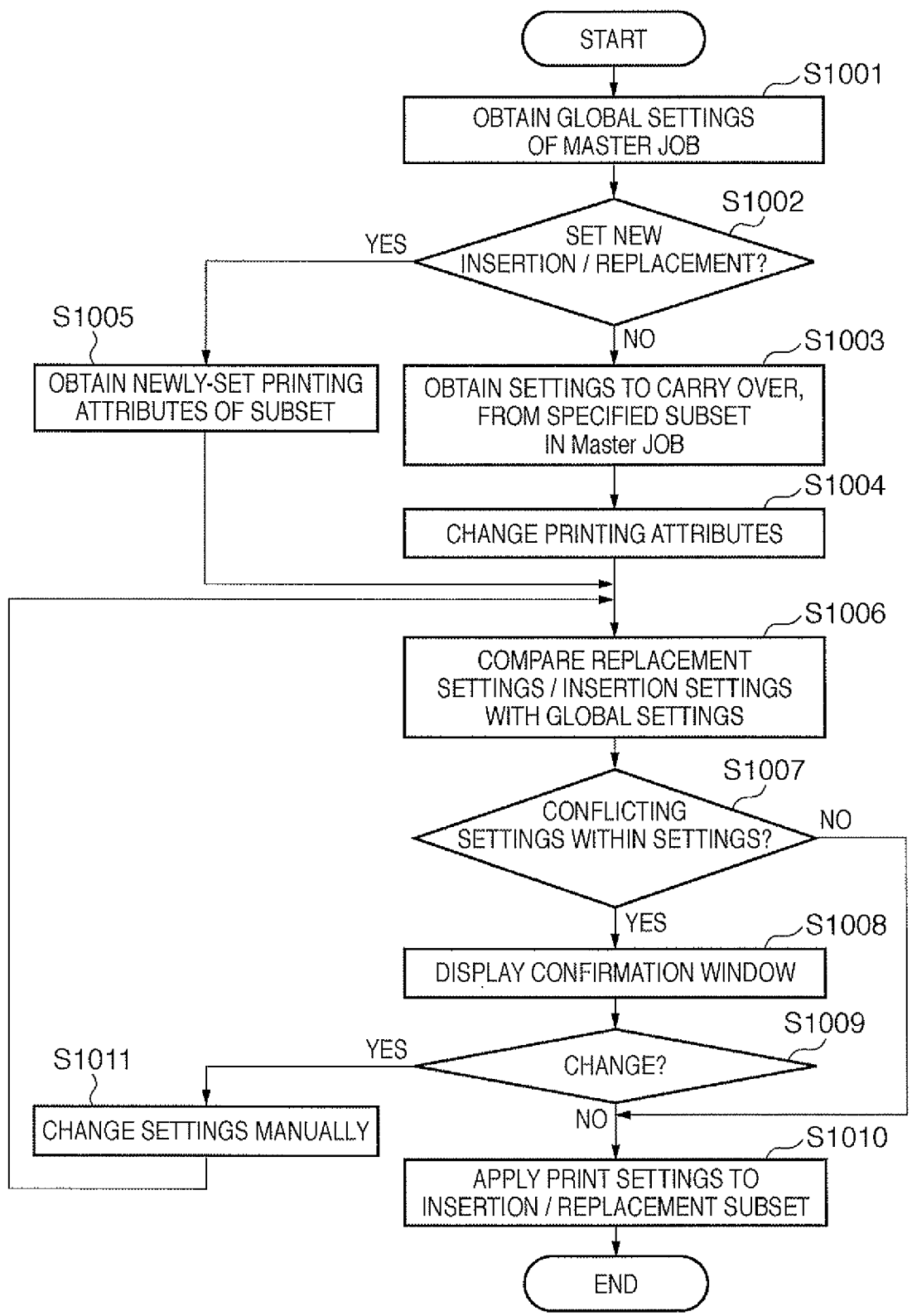
FIG. 10 is a flowchart illustrating a procedure for processing performed when carrying out an insertion or replacement process for a new subset.

FIG. 10 is a diagram illustrating the details of the processes of steps S906 and S910 shown in FIG. 9. Note that both the insertion and replacement processes shall be illustrated with reference to FIG. 10.

First, in step S1001, the print server 102 obtains the global settings 301 of the master job 300. The print server 102 detects the printing attributes set across all of the pages, including the subsets, as the global settings.

In step S1002, the print server 102 determines whether or not new printing attributes of insert/replacement data are set based on the presence/absence of printing attributes specified by the user through the button 1306 in the settings window shown in FIG. 13.

Here, if it has been determined that there are new settings, the procedure advances to step S1005. However, if it has been determined that there are no new settings, the procedure advances to step S1003.

In step S1003, the print server 102 obtains printing attributes to be applied to the insert data from the subset specified in step S904. The obtained printing attributes referred to here are finishing printing attributes unique to the subset, such as finishing settings, paper size, and so on.

In step S1004, the print server 102 changes of the printing attributes obtained in step S1003, printing attributes that have been changed in accordance with user instructions.

In step S1005, the print server 102 obtains the printing attributes newly applied to the insert/replacement data. These printing attributes are the printing attributes applied using the button 1306 in FIG. 13 or the button 1709 in FIG. 18.

In step S1006, the print server 102 compares the printing attributes changed in step S1004 or the new printing attributes of the insert data obtained in step S1005 with the global settings obtained in step S1001.

If, as a result of the comparison of step S1006, the print server 102 determines in step S1007 that the changed printing attributes or the new printing attributes conflict with the global settings, the procedure advances to step S1008.

As an example of a method for determining whether or not there is conflict, the print server 102 holds a conflict chart such as that shown in FIG. 20 in the printing attributes setting unit 206 in advance, and checks the points of conflict so that preference is given to the selection of the global settings. For example, if the punch location is set to be the left side of the paper in the global settings but has been changed to the right side of the paper in S1004, the print server 102 determines that the settings conflict with each other. If, however, it has been determined that there is no conflict, the procedure advances to step S1010.

Figure 17:
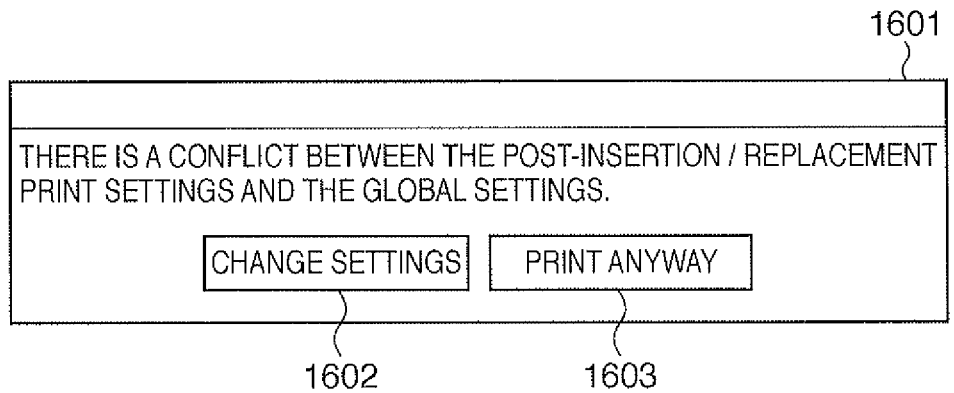
FIG. 17 is a diagram illustrating an example of a warning window that notifies a user of conflicting settings in the set printing attributes.

In step S1008, the print server 102 displays a warning window indicating that a point of conflict is present in the settings in step S1007 (see, for example, FIG. 17).

In step S1009, the print server 102 determines whether or not to change the printing attributes again, and if it has been determined that the printing attributes are to be changed again, the procedure advances to step S1011. If, however, it has been determined that the attributes are not to be changed, the procedure advances to step S1010. This determination is made based on, for example, whether a button 1602 or 1603 has been pressed in the warning window shown in FIG. 17. If the button 1602 has been pressed, it is determined that the settings are to be changed, and the procedure advances to step S1011, whereas if the button 1603 has been pressed, it is determined that printing is to be performed as-is, and the procedure advances to step S1010.

In the present embodiment, the warning window shown in FIG. 17 makes it possible to reduce the occurrence of jobs being cancelled by the output device or being outputted as-is with some inactive settings and printing commenced without changing remaining conflicts.

In step S1010, the print server 102 applies the global print settings, the printing attributes obtained from the subset, and the attributes changed in step S1004 to the insert data or replacement data.

In step S1011, the print server 102 changes the printing attributes in accordance with user instructions.

Figure 11:
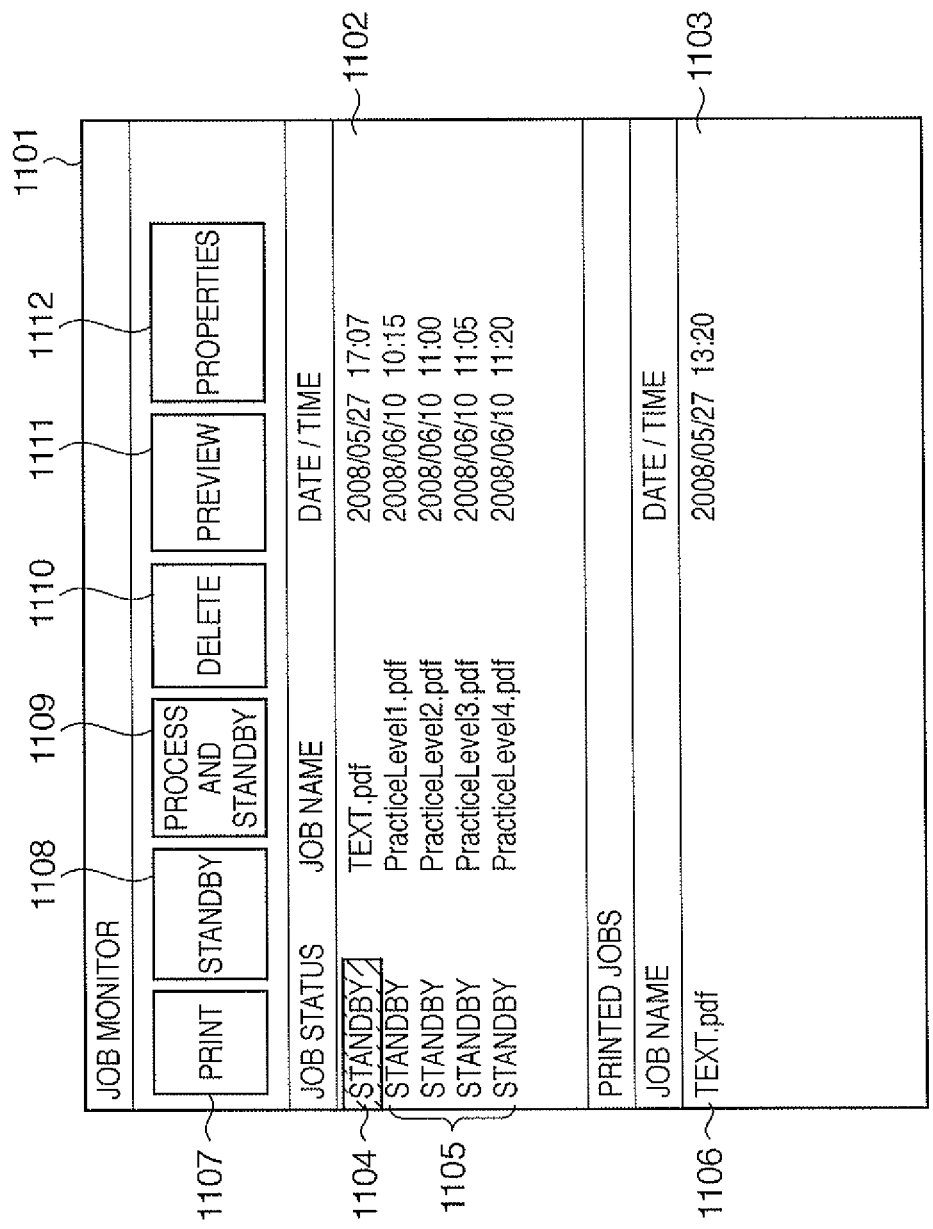
FIG. 11 is a diagram illustrating an example of a job monitor that displays the statuses of jobs managed by a print server.

FIG. 11 is a diagram illustrating an example of a job monitor 1101 that displays the statuses of jobs managed by the print server 102.

A window 1102 displays a list of jobs that are present in the print server queue. A window 1103, meanwhile, displays a history of printed jobs as a list. A job 1104 indicates text.pdf, which has been RIPped and is standing by in the RIP queue. Jobs 1105 indicate data that has not yet been RIPped.

A job 1106 indicates text.pdf, which is a printed job. A button 1107 is a printing instruction button, and pressing the button 1107 after selecting the job 1104 or one of the jobs 1105 that are standing by commences the printing of that job. If the job is standing by prior to RIPping, that job is printed after being RIPped.

A button 1108 is used when putting a job within the print server 102 into a standby state. Alternatively, selecting the job indicated as the printed job 1106 and pressing the button 1108 makes it possible to return the printed job to a standby state. It is also possible to RIP a job and place that job in a standby state by selecting one of the jobs 1105 that has not yet been RIPped and pressing a process and standby button 1109.

A selected job can be deleted by pressing a button 1110. Meanwhile, a preview of a selected job can be displayed by pressing a button 1111.

The printing attributes of a selected job can be set by pressing a button 1112. At this time, the printing attributes held by the printing attributes setting unit 206 can be referred to or edited using the properties button 1112.

Hereinafter, descriptions shall be given using an example of insertion/replacement. FIG. 12 is a diagram illustrating an example of a user interface when a job 1105 (Practice Level 2) is inserted into the RIPped text.pdf indicated as the job 1104 in FIG. 11.

A window 1201 is a window displayed when text.pdf indicated as the job 1104 is selected and the button 1111 is pressed. A display region 1202 indicates the name of the job laid out in a preview. A display region 1203 indicates the preview display of text.pdf.

A window 1204 indicates the global settings of text.pdf. In FIG. 12, the global settings indicate that the punch location is on the left, the number of punch holes is two, the binding method is long edge binding, and the discharge surface is face down. Checking this global settings display enables the user to confirm the printing attributes set for the master job as a whole at a single glance, thereby making it possible to reduce conflicting settings.

A button 1205 indicates a reduced preview size of the preview laid out in the display region 1203. Pressing a button

1206 changes the preview window to a page-by-page view. Edits made during the preview display can be saved by pressing a button 1207. Meanwhile, a copy of a selected page can be created by pressing a button 1208. Finally, a specified page or subset can be deleted by pressing a button 1209.

A window 1301 for inserting new data into the text laid out in the display region 1203 can be displayed by pressing a menu button 1210. Pressing a menu button 1211 displays a window 1701 for replacing a subset within a laid-out text with new data.

FIG. 13 is a diagram illustrating an example of a settings window displayed when inserting a document. The window 1301 is an insert selection window displayed when the menu button 1210 is pressed. A list of documents that can be inserted is displayed in a menu 1302. The selectable documents within the menu 1302 are the jobs 1105 indicated in FIG. 11, which are in a standby state within the print server 102.

The radio buttons 1303 and 1304 are buttons for selecting whether to set new printing attributes to be applied to the insert data or to carry over the settings of an existing subset. A menu 1305 is a list of subsets that is activated when the radio button 1304 is selected. The subsets displayed in this list are the subsets that are set within the master job 300. Note that while 1305 in FIG. 13 displays subsets C and D, other subsets can be displayed by scrolling the list. The same applies for 1702 and 1708 in FIG. 18, which shall be described later.

A button 1306 is a new settings button that displays a print settings window for a user to apply new printing attributes to the insert data, instead of applying the printing attributes of an existing subset to the insert data.

Pressing a button 1307 applies the obtained printing attributes to the document to be inserted, closes the subset insertion window, and returns to the preview window. Meanwhile, pressing a button 1308 cancels the settings in the window 1301, closes the subset insertion window, and returns to the window 1201.

Figure 14:
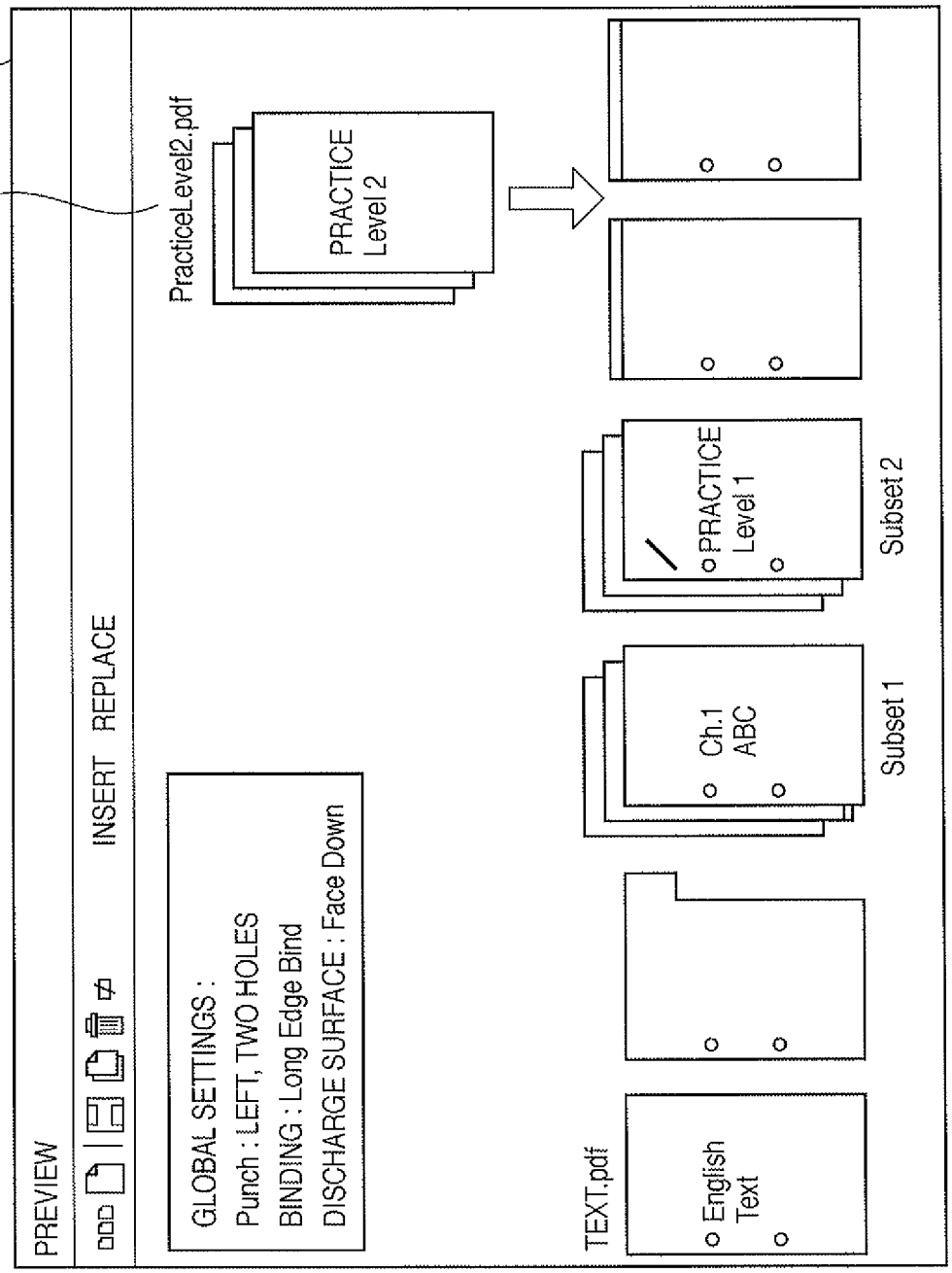
FIG. 14 is a diagram illustrating a window for setting the insertion location of insert data.

FIG. 14 is a diagram illustrating a window for setting the insertion location of the insert data specified in the window 1301. Insert data 1401 specified through the settings window shown in FIG. 13 is displayed in the window 1201. The insert data 1401 can be inserted into an arbitrary location through dragging and dropping.

Figure 15:
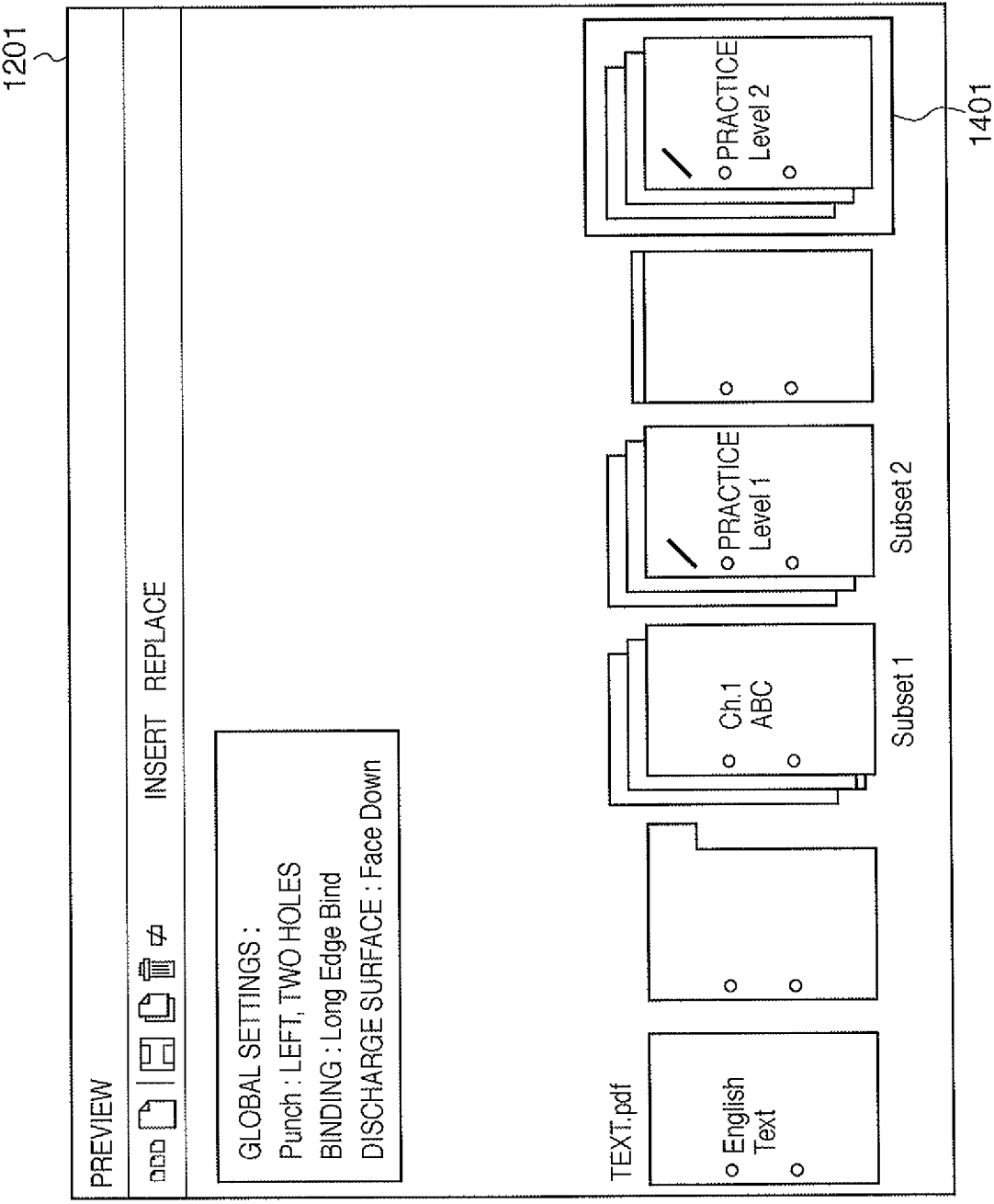
FIG. 15 is a diagram illustrating the insertion of insert data into a master job.

FIG. 15 is a diagram illustrating the dragged and dropped insert data 1401 being inserted into the master job 300. The data can be inserted at an arbitrary location as long as that insertion location is within the master job.

Figure 16:
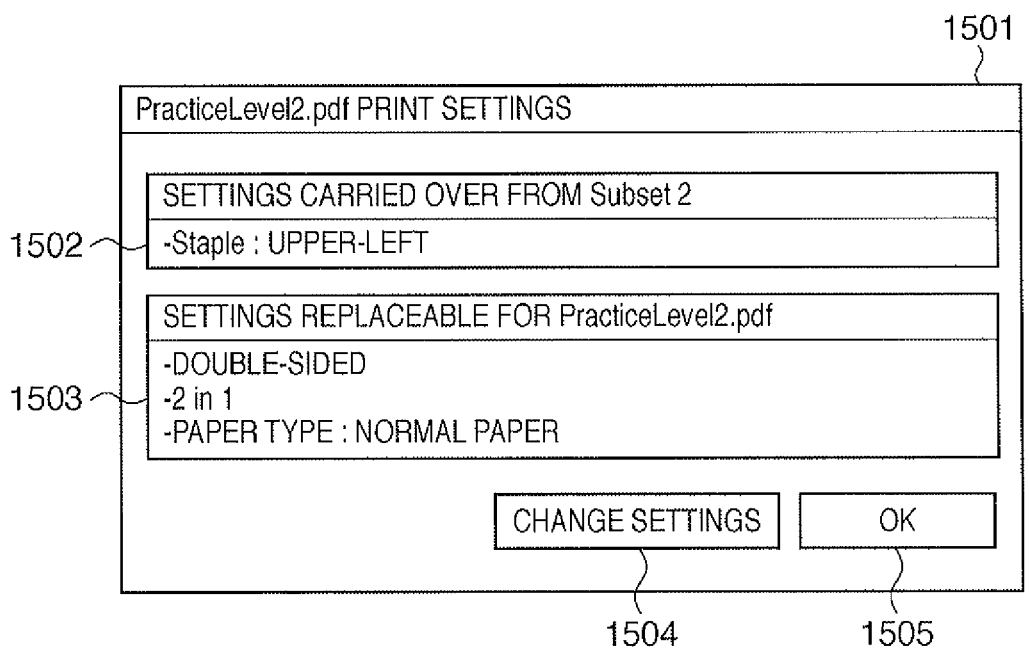
FIG. 16 is a diagram illustrating a window displaying printing attributes set for inserted data.

FIG. 16 is a diagram illustrating a window displaying printing attributes (print settings) set for inserted data. When the insert data 1401 is selected in the window 1201, a window 1501 for confirming the printing attributes is displayed. A display region 1502 indicates printing attributes that have been carried over from a subset 2. The display region 1502 indicates that the settings carried over from the subset 2 are upper-left stapling.

The "settings carried over" referred to here are primarily settings that are necessary to ensure that the finishing results are the same even after the insertion. Therefore, the paper size and so on can also be given as examples of settings carried over. Conversely, settings that are not necessary to carry over are settings related to image layout and thus do not influence the finishing results.

The settings to be carried over and the settings that are not necessary to carry over can be defined in advance and saved in the printing attributes setting unit 206. Alternatively, various printing attributes may be defined in advance with weighting, and the settings to be carried over can be determined based on that weighting.

A display region 1503 indicates print settings of the insert data, or "PracticeLevel2.pdf", that can be replaced. When changing these settings, a button 1504 is pressed and the settings are then changed. Alternatively, if there are no problems with the print settings displayed in the display regions 1502 and 1503, a button 1505 is pressed, closing the window 1501.

By displaying a settings confirmation window in this manner, the user can clarify the settings carried over from a specified subset and settings that can be replaced. As a result, the user's intended output can be achieved with greater efficiency. Furthermore, because the settings carried over at this time can also be confirmed, it is easy to return to the subset selection process of step S904 if the user wishes to carry over the settings of a different subset.

FIG. 17 is a diagram illustrating an example of the warning window that notifies the user of conflicting settings in the set printing attributes in step S1008 of FIG. 10. A window 1601 warning of conflicts is displayed in order to notify the user of those conflicts when, after the button 1505 shown in FIG. 16 has been pressed, there are conflicts between the global settings and other settings. The user can set the printing attributes once again by pressing a button 1602. Alternatively, the user can ignore the conflicts and execute the printing by pressing a button 1603. In such a case, however, there is the possibility of subset settings not being applied or the job being canceled by the output device due to the conflicts.

Displaying such a warning window enables the discovery, prior to output, of differences between the finishing of the master job after the insertion and the finishing of the master job before the insertion, thereby reducing wasteful printing. Furthermore, the user is notified of the presence of settings that he or she did not intend, making it possible to prevent printing mistakes.

FIG. 18 is a diagram illustrating an example of a settings window for replacing a subset within a master job. When the menu button 1211 shown in FIG. 12 is pressed, a window 1701 is displayed. The subset to be replaced is selected using a menu 1702. The subsets displayed at this time are the subsets that are defined within the master job 300.

The replacement data that is to replace the subset to be replaced is selected using a menu 1703. The display data (here, shown as a document) is data held in the same print server 102 that holds the master job 300.

Pressing a button 1704 applies the details set in the window 1701 and closes the window 1701. However, pressing a button 1705 cancels the settings in the window 1701 and closes the window.

Radio buttons 1706 and 1707 are buttons for selecting whether to set new printing attributes to be applied to the insert data or to carry over the attributes of an existing subset. A menu 1708 is a list of subsets that is activated when the radio button 1707 is selected. The subsets displayed in this list are the subsets that are set within the master job 300.

A button 1709 is a new settings button that displays a print settings window for a user to set new printing attributes for the replacement data, instead of the user applying the settings of the subset to be replaced to the replacement data.

Figure 19:
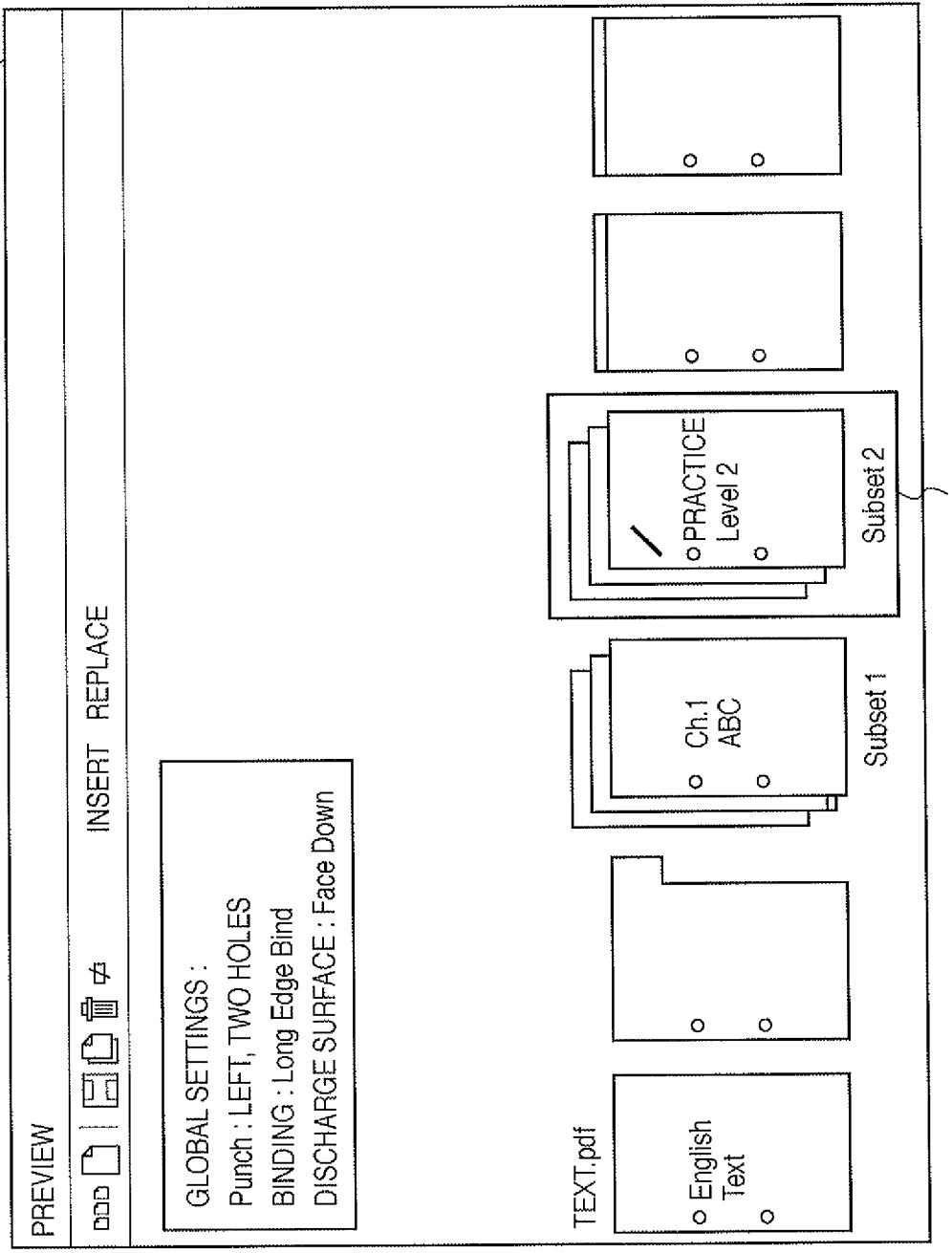
FIG. 19 is a diagram illustrating a subset for replacement being replaced by replacement data.

A display region 1801 shown in FIG. 19 shows, as a preview, the subset to be replaced being replaced by the replacement data 701 with the content determined using the window 1701.

FIG. 20 illustrates, in chart form, an example of conflicts between global print settings and individual subset print settings; this table is held in the printing attributes setting unit 206. The horizontal axis indicates the global settings, whereas the vertical axis indicates the subset settings. At the locations where the respective settings intersect, an "x" indicates conflicting settings, whereas an "o" indicates that there is no conflict. When conflicting settings have been selected by the user, the user is notified through the warning window shown in FIG. 17 that conflicting settings are present in the items newly set by the user.

As described thus far, in the present embodiment, the convenience and operability can be improved when inserting new data (subsets) or replacing data in a RIPped job containing multiple subsets.

Furthermore, in the present embodiment, print settings to be applied to a subset to be inserted or replaced can be selected arbitrarily from among existing subsets. In addition, when performing an insertion process, a new subset can be inserted at an arbitrary location.

Furthermore, rather than once again RIPping an entire job in which an insertion or replacing process has been performed, only the insertion or replacement subset is RIPped. This makes it possible to reduce the amount of time from making print settings to printing the output, increasing the speed of the print processing.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-008244, filed Jan. 16, 2009, which is hereby incorporated by reference herein in its entirety.

What is claimed is:

1. An image forming apparatus capable of applying print settings to each of subsets, in a file, that contains multiple pages, the apparatus comprising:
    a first designation unit configured to designate a first subset in a case where one of the subsets in the file is replaced with the first subset;
    a setting unit configured to set a target subset which exists in the file to be replaced with the first subset;
    a replacement unit configured to apply a print setting of the target subset set by the setting unit to the first subset and replace the target subset with the first subset;
    a second designation unit configured to designate a second subset to be inserted in the file;
    a selection unit configured to select either a first applying method for applying a new created print setting to the second subset or a second applying method for applying an existing print setting of one of the subsets to the second subset;
    a subset selection unit configured to select, from the subsets that exist in the file, a subset having a print setting that is to be applied to the second subset, in a case where the second applying method is selected;
    an insertion unit configured (i) to, in a case where the second applying method is selected, insert the second subset to the file, wherein a print setting of the subset selected by the selection unit is applied to the second subset, and (ii) to, in a case where the first applying method is selected, insert the second subset to the file, wherein the new created print setting is applied to the second subset; and
    a generating unit configured to generate a print job comprising the first and second subsets.

2. The image forming apparatus according to claim 1, further comprising:
    an obtainment unit configured to obtain a print setting applied to the file as a whole;
    a changing unit configured to change a setting that is not a finishing setting among print settings applied to the first or second subset;
    a determination unit configured to determine whether or not the setting changed by the changing unit conflicts with the print setting obtained by the obtainment unit; and
    a display unit configured to display a warning window in a case where a result by the determination unit indicates that the setting changed by the changing unit conflicts with the print setting obtained by the obtainment unit.

3. An image forming method executed by an image forming apparatus capable of applying print settings to each of subsets, in a file, that contains multiple pages, the method comprising the steps of:
    first designating a first subset in a case where one of the subsets in the file is replaced with the first subset;
    setting a target subset which exists in the file to be replaced with the first subset;
    applying a print setting of the target subset set by the step of setting to the first subset and replacing the target subset with the first subset;
    second designating a second subset to be inserted in the file;
    first selecting either a first applying method for applying a new created print setting to the second subset or a second applying method for applying an existing print setting of one of the subsets to the second subset;
    second selecting, from the subsets that exist in the file, a subset having a print setting that is to be applied to the second subset, in a case where the second applying method is selected;
    inserting, (i) in a case where the second applying method is selected, the second subset to the file, wherein a print setting of the subset selected by the second selecting is applied to the second subset, and, inserting (ii) in a case where the first applying method is selected, the second subset to the file, wherein the new created print setting is applied to the second subset; and
    generating a print job comprising the first and second subsets.

4. The image forming method according to claim 3, further comprising the steps of:
    obtaining a print setting applied to the file as a whole;
    changing a setting that is not a finishing setting among print settings applied to the first or second subset;
    determining whether or not the setting changed in the changing step conflicts with the print setting obtained in the obtaining step; and displaying a warning window in a case where a result of the determination in the determining step indicates that the setting changed in the changing step conflicts with the print setting obtained in the obtaining step.

5. A non-transitory computer-readable storage medium holding a program for applying print settings to each of subsets, in a file, that contains multiple pages, the program causing a computer to:

first designate a first subset in a case where one of the subsets in the file is replaced with the first subset;

set a target subset which exists in the file to be replaced with the first subset;

apply a print setting of the target subset to the first subset and replace the target subset with the first subset;

second designate a second subset to be inserted in the file;

first select either a first applying method for applying a new created print setting to the second subset or a second applying method for applying an existing print setting of one of the subsets to the second subset;

second select, from the subsets that exist in the file, a subset having a print setting that is to be applied to the second subset, in a case where the second applying method is selected;

insert, (i) in a case where the second applying method is selected, the second subset to the file, wherein a print setting of the subset selected by the second select is applied to the second subset, and, insert (ii) in a case where the first applying method is selected, the second subset to the file, wherein the new created print setting is applied to the second subset; and generate a print job comprising the first and second subsets.

6. The non-transitory computer-readable storage medium according to claim 5, holding a program that further causes the computer to:

obtain a print setting applied to the file as a whole;

change a setting that is not a finishing setting among print settings applied to the first or second subset;

determine whether or not the changed setting conflicts with the obtained print setting; and display a warning window in a case where it has been determined that the changed setting conflicts with the obtained print setting.

7. The image forming apparatus according to claim 1, further comprising:

a display control unit configured to display subsets in the file based on the print settings.

8. The image forming method according to claim 3, further comprising:

displaying subsets in the file based on the print settings.

9. The non-transitory computer-readable storage medium according to claim 5, holding a program that further causes the computer to:

display subsets in the file based on the print settings.

* * * * *